(12) United States Patent
Jakobsson

(10) Patent No.: US 6,246,867 B1
(45) Date of Patent: Jun. 12, 2001

(54) METHOD AND APPARATUS FOR SAVING CURRENT WHILE PERFORMING SIGNAL STRENGTH MEASUREMENTS IN A HOMODYNE RECEIVER

(75) Inventor: Peter Jakobsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/192,508

(22) Filed: Nov. 17, 1998

(51) Int. Cl.[7] .............................. H04B 1/26; H04Q 7/18
(52) U.S. Cl. .................... 455/324; 455/38.3; 455/134; 455/161.2; 455/161.3; 455/226.1; 455/226.2; 455/311
(58) Field of Search ........................ 455/324, 311, 455/226.2, 189.1, 38.3, 134, 76, 161.3, 161.2, 314, 207, 226.1

(56) References Cited

U.S. PATENT DOCUMENTS

| | | | |
|---|---|---|---|
| 4,736,390 | * 4/1988 | Ward et al. | 455/324 |
| 5,530,929 | * 6/1996 | Lindqvist et al. | 455/324 |
| 5,604,746 | * 2/1997 | Oto | 455/324 |
| 5,712,637 | * 1/1998 | Lindquist et al. | 341/155 |
| 5,749,051 | * 5/1998 | Dent | 455/324 |
| 5,826,180 | * 10/1998 | Golan | 455/324 |
| 5,828,955 | * 10/1998 | Lipowski et al. | 455/324 |
| 5,838,735 | * 11/1998 | Khullar | 455/324 |
| 5,850,598 | * 12/1998 | Behrent | 455/324 |
| 5,960,325 | * 9/1999 | Graham | 455/38.3 |
| 6,029,058 | * 2/2000 | Namgoong et al. | 455/324 |

* cited by examiner

*Primary Examiner*—Lee Nguyen
*Assistant Examiner*—Simon Nguyen
(74) *Attorney, Agent, or Firm*—Burns, Doane, Swecker & Mathis, L.L.P.

(57) ABSTRACT

To solve the problems associated with conventional signal strength measurements utilizing homodyne receivers, the present invention is able to economically reduce the idle time power usage of a homodyne receiver by "powering down" a part of the homodyne receiver. With certain signal modulations, the power received in each channel of the homodyne receiver is equivalent and, as a result, the estimated received signal strength measurement calculation is simplified, reducing the power usage, which can be very useful, especially in the mobile communications industry.

14 Claims, 4 Drawing Sheets

METHOD AND APPARATUS FOR SAVING CURRENT WHILE PERFORMING SIGNAL STRENGTH MEASUREMENTS IN A HOMODYNE RECEIVER

BACKGROUND

The present invention relates to homodyne radio receivers, and more particularly, to a method and device which reduces the amount of current required to perform signal strength measurements within homodyne receivers.

Communication systems that communicate voice and data messages are extensively used in telephony and wireless communication systems. For example, European Telecommunication Standard Institute (ETSI) has specified a Global Standard for Mobile Communication (GSM) that uses time division multiple access (TDMA) to communicate control, voice and data information over radio frequency (RF) channels. In the U.S., Telecommunication Industry Association (TIA) has published a number of Interim Standards, such as IS-54 and IS-136, that define various versions of digital advanced mobile phone service (D-AMPS), with the capability of transmitting voice and data to subscribers. These types of communication system covers a geographical area that is subdivided into communication cells, which together provide communication coverage to a service area, for example, an entire city.

In a GSM communication system, for example, each cell is served by one or more base stations that communicate with mobile stations over down link and uplink RF channels. The RF channels are subdivided into a number of time slots, which are known as logical channels. Speech or data is transmitted during logical channels designated as traffic channels (TCH) and signaling information pertaining to call management in the system, including, synchronization and hand over are handled over control channels. In the GSM system, control channels are grouped as broadcast channels (BCH), common control channels (CCH), dedicated control channels (DCCH), and SMS broadcast channel (S-BCCH). BCHs are used for frequency correction, synchronization, and communicating cell specific information. BCHs, which are mapped on time slot 0 of an RF channel, include frequency correction channel (FCCH), synchronization channel (SCH), and broadcast control channel (BCCH). FCCH is used for transmitting a sine wave signal, which serves to identify the BCH and to enable the mobile stations to synchronize to the BCH frequency. The SCH is used to synchronize the mobile stations with the TDMA frame structure within a particular cell and to identify a chosen cell as a GSM cell using a Base Station Identity Code (BSIC), which identifies the cells in the handover process.

CCHs, which are mapped over a number of time slots, are used for access and allocation of signaling control channels. CCHs include paging channel (PCH), access grant channel (AGCH), and random access channel (RACH). PCH is a paging channel used for alerting a called mobile station using a mobile station identity number (IMSI). AGCH is used for assigning a signalling channel. RACH is used by the mobile stations for requesting a call initiation or answering with a channel request when called. Conventionally, the base stations transmit messages to the mobile stations over one or more allocated downlink control channels with full power if there is no traffic in the cell, in order to enable the mobile stations to synchronize for communication within a cell.

Preferably, the communication cells are patterned according to a cell pattern that allows some of the spaced apart cells to use the same uplink and downlink RF channels. In this way, the cell pattern of the system reduces the number of RF channels needed to cover the service area. The RF channels are planned in a way that reduces interference to improve system performance in terms of call set-up and handover. A sparse reuse is required for the BCCH frequencies which today often are planned in a 12 reuse pattern. It is, however, desirable to plan the RF channels in a tighter reuse pattern, which is of particular importance when communicating within a limited spectrum of for example 5–6 MHz. Because the control channel resources are a large portion of the total available spectrum, tighter control channel reuse increases traffic capacity by allowing more RF channels to be allocated as TCHs. A tighter channel reuse, however, results in performance degradation of the control channels.

In an IS-54 standard system, each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in the IS-54 standard, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output. The remaining bits are used for guard times and overhead signaling for purposes such as synchronization.

It can be seen that a TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control channels for carrying call-setup messages between base stations and mobile stations. According to the IS-54 standard, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station tunes in to, and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by IS-54 has been improved in a system having digital control channels (DCCHs) that is specified in TIA/EIA/IS-136 (IS-136). Using such DCCHs, each IS-54 radio channel can carry DTCs only, DCCHs only, or a mixture of both DTCs and DCCHs. Within the IS-136 framework, each radio carrier frequency can have up to three full-rate DTCs/DCCHs, or six half-rate DTCs/DCCHs, or any combination in between, for example, one full-rate and four half-rate DTCs/DCCHs.

In general, however, the transmission rate of the DCCH need not coincide with the half-rate and full-rate specified in IS-54, and the length of the DCCH slots may not be uniform and may not coincide with the length of the DTC slots. The DCCH may be defined on an IS-54 radio channel and may consist, for example, of every n-th slot in the stream of consecutive TDMA slots. In this case, the length of each DCCH slot may or may not be equal to 6.67 msec, which is the length of a DTC slot according to the IS-54 standard. Alternatively (and without limitation on other possible alternatives), these DCCH slots may be defined in other ways known to one skilled in the art.

FIG. 1(a) shows a general example of a forward (or downlink) DCCH configured as a succession of time slots 1, 2, . . . , N, . . . included in the consecutive time slots 1, 2, . . . sent on a carrier frequency, in connection with the IS-136 standard. These DCCH slots may be defined on a radio channel such as that specified by IS-136, and may consist, as seen in FIG. 1(a) for example, of every n-th slot in a series of consecutive slots. Each DCCH slot has a duration that may or may not be 6.67 msec, which is the length of a DTC slot according to the IS-136 standard.

As shown in FIG. 1(a), the DCCH slots may be organized into superframes (SF), and each superframe includes a number of logical channels that carry different kinds of information. One or more DCCH slots may be allocated to each logical channel in the superframe. The exemplary downlink superframe in FIG. 1(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 1(a) may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 1(b) illustrates a preferred information format for the slots of a forward DCCH. The information transferred in each slot comprises a plurality of fields, and FIG. 1(b) indicates the number of bits in each field above that field. The bits sent in the SYNC field are used in a conventional way to help ensure accurate reception of the CSFP and DATA fields. The SYNC field carries a predetermined bit pattern used by the base stations to find the start of the slot. The SCF field is used to control a random access channel (RACH), which is used by the mobile to request access to the system. The CSFP information conveys a coded superframe phase value that enables the mobile stations to find the start of each superframe. This is just one example for the information format in the slots of the forward DCCH. FIG. 1(c) illustrates the 12 bit allocation for the CSFP field which includes bits $d_7$–$d_0$ and check bits $b_3$–$b_0$.

For purposes of efficient sleep mode operation and fast cell selection, the BCCH may be divided into a number of sub-channels. A BCCH structure is known that allows the mobile station to read a minimum amount of information when it is switched on (when it locks onto a DCCH) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

FIG. 2 represents a block diagram of an exemplary cellular mobile radiotelephone system, including an exemplary base station 210 and mobile station 220. The base station includes a control and processing unit 230 which is connected to the MSC 240 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System," which is incorporated in this application by reference.

The base station 210 handles a plurality of voice channels through a voice channel transceiver 250, which is controlled by the control and processing unit 230. Also, each base station includes a control channel transceiver 260, which may be capable of handling more than one control channel. The control channel transceiver 260 is controlled by the control and processing unit 230. The control channel transceiver 260 broadcasts control information over the control channel of the base station or cell to mobiles locked to that control channel. It will be understood that the transceivers 250 and 260 can be implemented as a single device, like the voice and control transceiver 270, for use with DCCHs and DTCs that share the same radio carrier frequency.

The mobile station 220 receives the information broadcast on a control channel at its voice and control channel transceiver 270. Then, the processing unit 280 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

The systems specified by the IS-54 and IS-136 standards are circuit-switched technology, which is a type of "connection-oriented" communication that establishes a physical call connection and maintains that connection for as long as the communicating end-systems have data to exchange. While circuit switch technology has been discussed above, packet-switched technology can also be envisioned employing time division multiplexing.

In the signal strength measuring technique used in IS-136 and GSM standard systems, the control channel is used for performing the signal strength measurement during a sleep mode, in which the mobile station is awake for one time slot (its paging slot) and asleep for the remaining time slots of the superframe. A homodyne receiver is commonly utilized to receive signals within mobile stations and perform signal strength measurements during the idle time slot. A superheterodyne receiver, which is a more general variation of a homodyne receiver, receives signals in a first frequency band and by mixing the received signal with a locally generated oscillatory signal converts them to a second or intermediate frequency band. By choosing the local oscillator signal to have a constant frequency offset relative to a selected signal in the first frequency band, the selected signal always appears at the same frequency in the intermediate frequency band. In this way, locking to the selected signal may be facilitated by a fixed-tuned, intermediate frequency filter.

In a homodyne receiver, the chosen intermediate frequency band is DC or zero frequency. The local oscillator therefore has a zero frequency separation from the selected signal. Any modulation on the selected signal that causes spectral components both above and below the nominal signal frequency becomes folded at the mixer output, as a component below or above the signal frequency will appear at the intermediate frequency above the nominal of zero. To allow for resolution of such folded components, two mixers are provided in a homodyne receiver using local oscillator signals that are phase offset by 90 degrees. The components above and below the nominal signal frequency then appear folded as I at one mixer and Qj at the other mixer.

Due to the fact that a homodyne receiver divides the received signal into both an I- and a Q-channel, more hardware (e.g., amplifiers and analog-to-digital converters) is required to be activated to receive and calculate signal strength. As such, employing homodyne receivers in mobile stations can result in higher amounts of current consumption thereby reducing the mobile station's battery life. Reducing a receiver's monitor-time used to receive data used for calculating signal strength is not a viable answer as the less monitor time allowed, the more uncertain the signal strength calculations. Accordingly, there is a need to reduce the amount of current consumption when using a homodyne receiver when performing signal strength measurements in a mobile communications system while not reducing the monitor time of the receiver.

SUMMARY

To solve the problems associated with conventional signal strength measurements utilizing homodyne receivers, the present invention is able to economically reduce the idle time power usage of a homodyne receiver by "powering down" a part of the homodyne receiver while not reducing the monitor time of the receiver. With certain signal modulations, the power received in each channel of the homodyne receiver is equivalent and, as a result, the estimated received signal strength measurement calculation is simplified, leading to the reduction of power usage, which can be very useful, especially in the mobile communications industry.

An exemplary embodiment of the present invention comprises a homodyne receiver used in performing a signal strength measurement which further comprises: an antenna for receiving an incoming signal; a down converter connected to said amplifier for converting a received signal an amplifier for amplifying the incoming signal; to complex baseband signals I and Q on two separate channels; and a signal processor connected to said down converter for powering down elements either of said I-channel or said Q-channel and processing said remaining channel to produce an estimated signal strength measurement.

In another exemplary embodiment of the present invention, a method of performing signal strength measurements in a homodyne receiver is illustrated which comprises the steps of: receiving an incoming signal; converting said received signal to complex baseband signals I and Q on two separate channels; and powering down elements either of said I-channel or said Q-channel and processing said remaining channel to produce an estimated signal strength measurement.

In yet another exemplary embodiment of the present invention, a receiver for receiving transmitted signals is described, which comprises: an antenna for receiving transmitted signals; a down converter connected to said amplifier for converting a received signal to complex baseband signals I and Q on two separate channels; and a signal processor connected to said down converter for powering down elements either of said I-channel or said Q-channel and processing said remaining channel to produce an estimated signal strength measurement.

DRAWINGS

These and other features, objects and advantages associated with the present invention will be more readily understood upon reading the following detailed description, when read in conjunction with the drawings in which like reference numerals refer to like elements and where:

DETAILED DESCRIPTION

The present invention will now be described with reference to the accompanying drawings, in which various exemplary embodiments of the invention are shown. However, this invention may be embodied in many different forms and should not be construed as limited to the specific embodiments shown. For example, while the present invention is described in a TDMA environment, it could also be applied to a code division multiplex access (CDMA) environment.

Figure 1A:
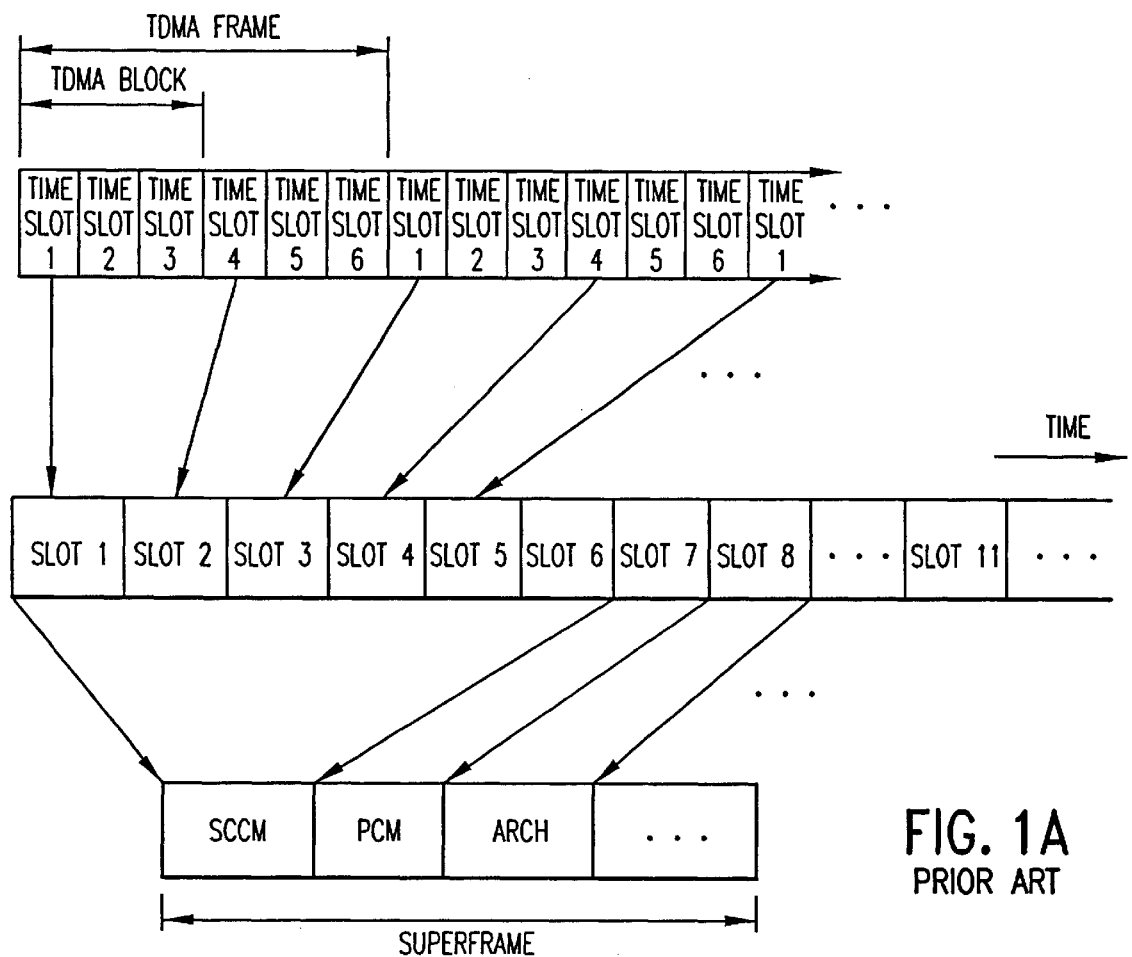
FIG. 1(a) illustrates a forward DCCH configured as a succession of time slots included in the consecutive time slots sent on a carrier frequency.
Figure 1B:
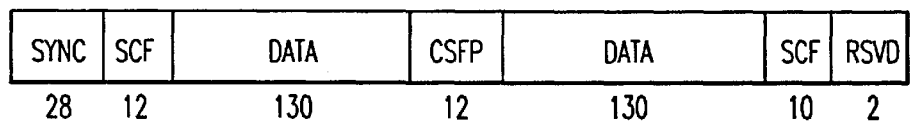
FIG. 1(b) illustrates an example of and IS-136 DCCH field slot format.
Figure 1C:
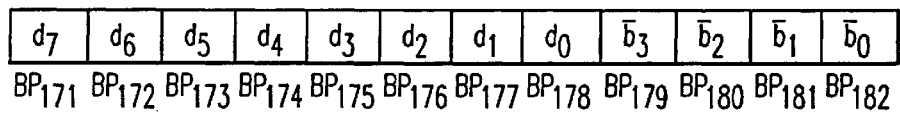
FIG. 1(c) illustrates an example of CSFP bit allocation.
Figure 2:
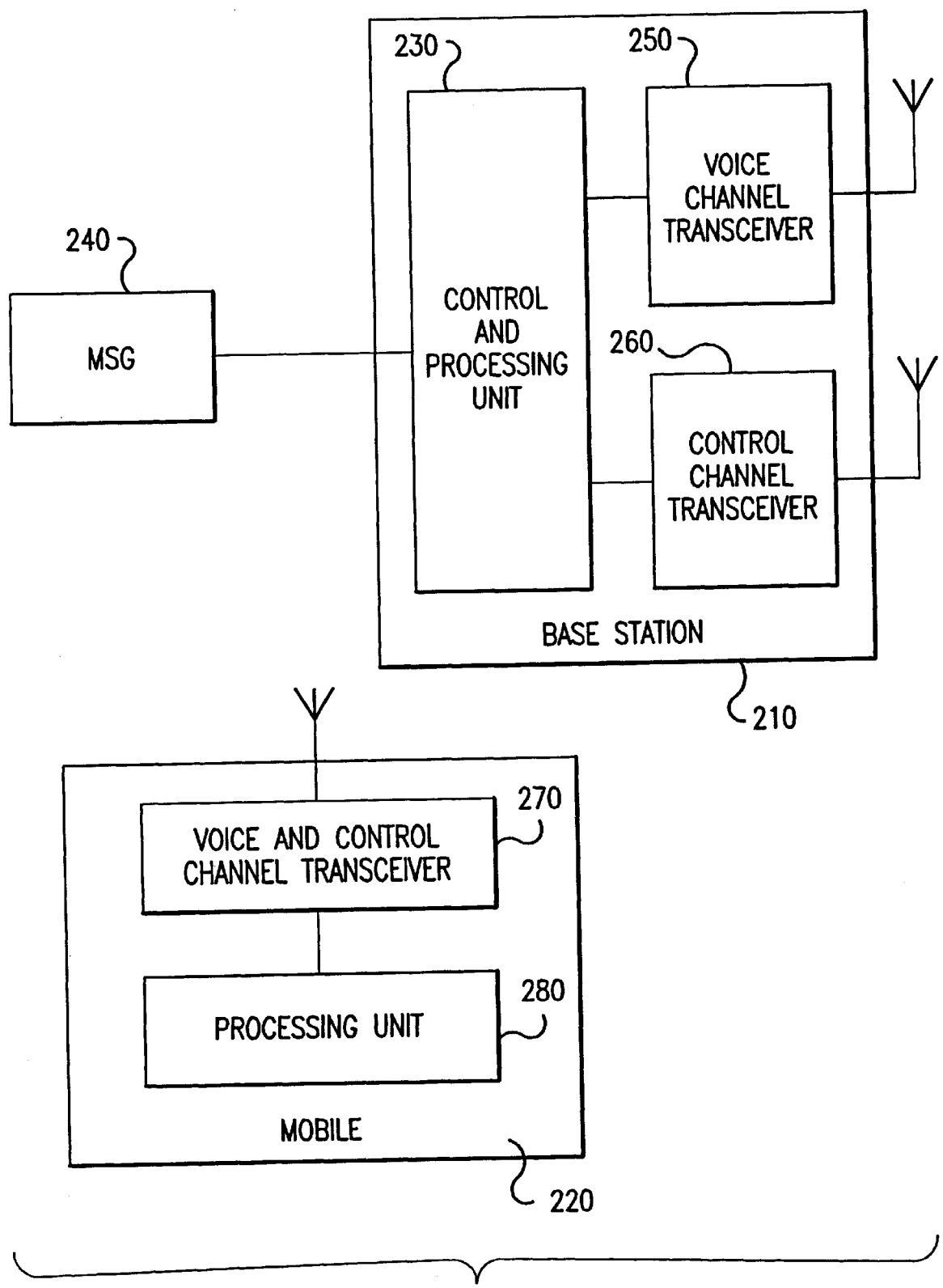
FIG. 2 is a block diagram of a cellular mobile radiotelephone system in accordance with an exemplary embodiment of the present invention.
Figure 3:
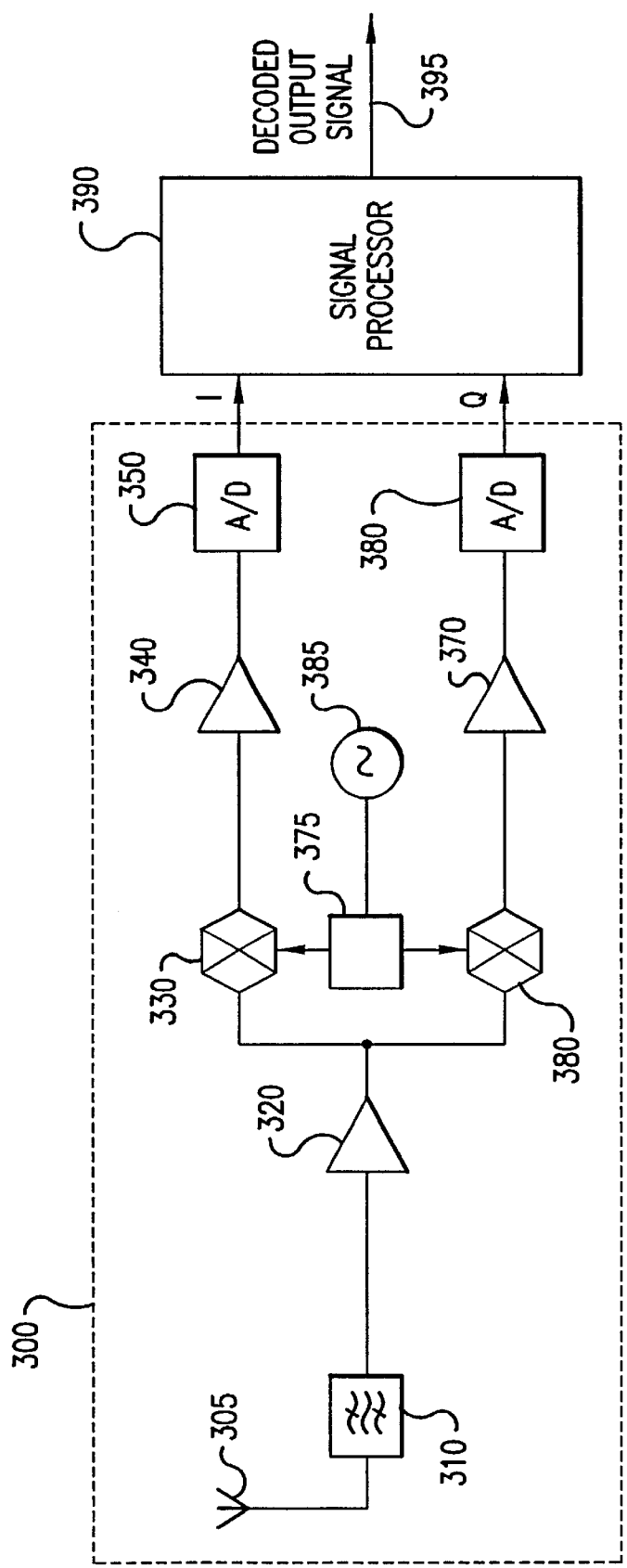
FIG. 3 is a schematic diagram of a conventional homodyne receiver which can be employed within cellular communications systems.

FIG. 3 depicts a conventional homodyne receiver 300 which can be employed within the mobile communication system as described above with respect to FIG. 2. As shown, the receiver 300 comprises an antenna 305, a first filter 310, a first (low-noise) amplifier (LNA) 320, a first mixer 330, amplifier 340, a first analog to digital (A/D) converter 350, a phase shifter 375, a local oscillator 385, a second mixer 360, a amplifier 370 and a second analog to digital (A/D) converter 380.

In FIG. 3, an output of the antenna 305 is coupled to an input of the first filter 310 and an output of the first filter 310 is coupled to an input of the first amplifier 320. An output of the first amplifier 320 is coupled to an input of the first mixer 330 and to an input of the second mixer 360. Additionally, an output of the first mixer 330 is coupled to an input of the amplifier 340 and an output of the amplifier 340 is coupled to an input of the A/D converter 350. An output of the analog to digital converter 350 serves as a first output I of the receiver 300.

Additionally, an output of the second mixer 360 is coupled to an input of the amplifier 370 and an output of the amplifier 370 is coupled to an input of second A/D converter 380. An output of the analog to digital converter 380 serves as a second output Q of the receiver 300. An output of the local oscillator 385 is coupled to an input of the phase shifter 375. A 0-degree output of the phase shifter 375 is coupled to an input of the first mixer 330 and a π/2 output of the phase shifter 375 is coupled to an input of the second mixer 360. In operation, the RF signal is down-converted directly to baseband or DC. The two outputs from the homodyne receiver 300 are then sent to a signal processor 390 for further processing.

When performing signal strength measurements, the signal processor 390, in order to determine the mean received signal strength over the time period of the time slot, performs the following calculation:

$$\text{Mean } RSSI = \frac{1}{N} \sum_N \sqrt{I(n)^2 + Q(n)^2} \; ; \tag{1}$$

where N is the number of samples and I(n) and Q(n) represent measured RSSI levels. Using this formulation to calculate the mean signal strength for the detected signal in the homodyne receiver require both the I and the Q outputs from the receiver. This algorithm determines the RSSI as follows: A frame of data is received on the current channel and an RSSI sample is taken. The result of the sample is then stored in a buffer located in the signal processor 390. The value is added and averaged over approximately 25 frames of data received by the receiver. This determination, however, requires the all of power amplifiers 320, 340, 370 and both A/D converters 350, 380 of the receiver to be "powered up", thereby reducing the life of a battery supplying power to the receiver.

As illustrated by equation (1), in order to calculate the average received signal strength during a sampling period of a time period both channels must be powered on. If however, the power received at both channels can be made to be the same, then the calculation for signal strength measurements can be simplified as follows:

$$\text{Mean } RSSI = \frac{\sqrt{2}}{N} \sum_N \sqrt{I(n)^2} \text{ or } \frac{\sqrt{2}}{N} \sum_N \sqrt{Q(n)^2} \; ; \tag{2}$$

where N is the number of samples and I(n) and Q(n) represent measured RSSI levels.

Figure 4:
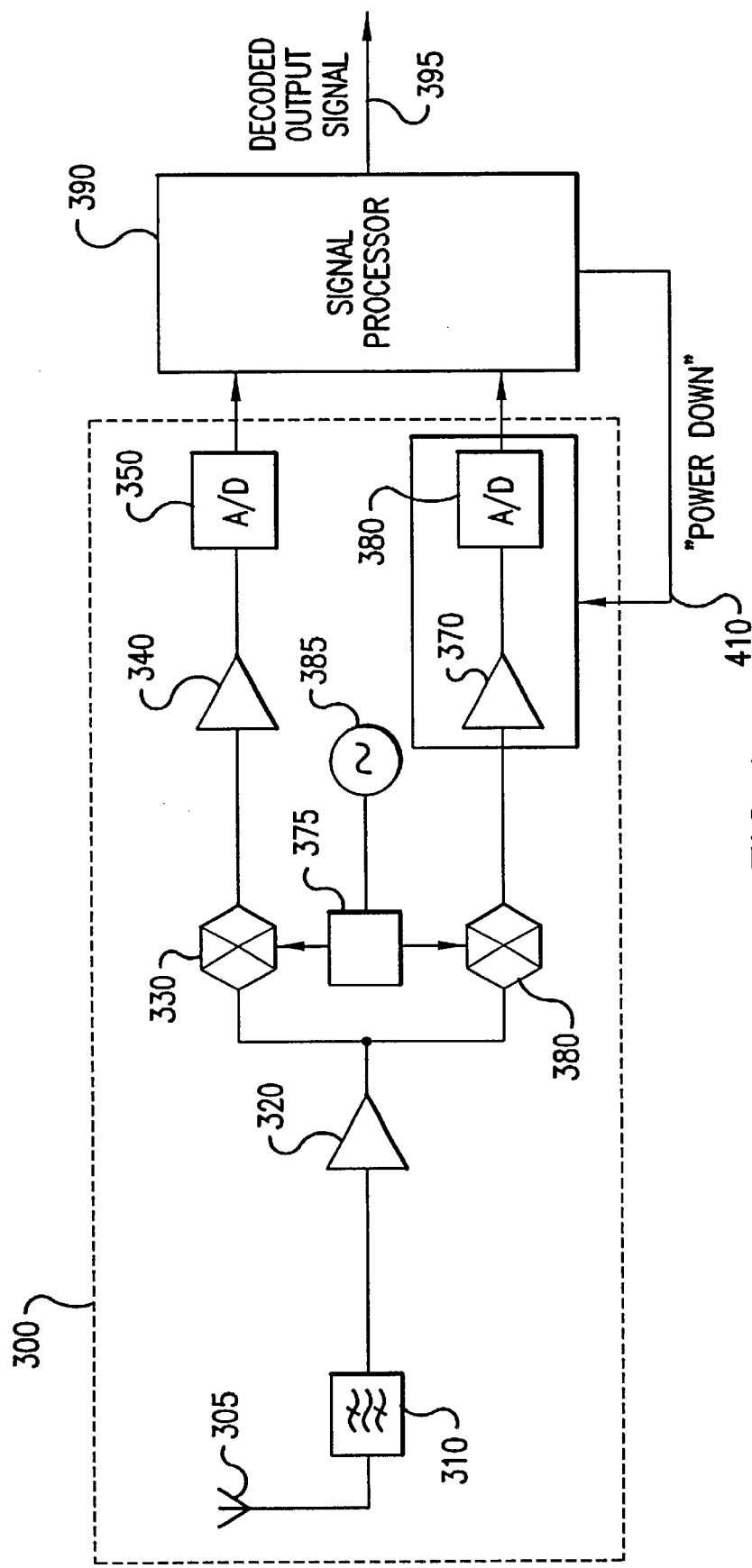
FIG. 4 is a schematic diagram of an exemplary homodyne receiver utilized in accordance with the present invention.

As a result, a homodyne receiver can be constructed that employs the advantageous calculation described above. This is addressed according to exemplary embodiments of the present invention by, as illustrated in FIG. 4, providing a homodyne receiver 300 which contains the same basic components as the homodyne receiver described with respect to FIG. 3. However, in accordance with an exemplary embodiment of the present invention, an output 410 from the signal processor 390 to the power amplifier 370 and analog-to-digital converter 380 is shown. The signal processor 390 in the receiver 300, powers down the amplifier 370 and A/D converter 380 if signal strength measurements are to be detected during a time period. While the power down signal is shown to be connected to the Q-channel in FIG. 4, it should be understood by one skilled in the art that receivers, according to the present invention, can power down either the I-channel or the Q-channel, as long as the power received in each channel is the same.

If the receiver 300 is receiving signals that have been modulated using PN sequences, for example, then the power in the I-channel would be equal to the power in the Q-channel. Other types of modulated sequences such GMSK-modulated sequences can also be employed in the homodyne receiver 300 in accordance with an exemplary embodiment of the present invention. If the received signal is modulated so that the power received in the I- and Q-channels is the same, then one channel can be powered down during signal strength measurements. Accordingly, the battery usage by the receiver is reduced while maintaining the same monitor time.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings without departing from the substance of the scope of the invention.

What is claimed is:

1. A receiver used in performing a signal strength measurement, comprising:
    an antenna for receiving an incoming signal;
    a down converter connected to an amplifier for converting a received signal to complex baseband signals I and Q on two channels; and
    a signal processor connected to said down converter for powering down at least one element either of said I channel or said Q channel and processing a remaining channel of said I channel and said Q channel to produce said signal strength measurement.

2. The receiver of claim 1, wherein said signal processor calculates $$\text{Mean } RSSI = \frac{\sqrt{2}}{N} \sum_N \sqrt{I(n)^2} \text{ or } \frac{\sqrt{2}}{N} \sum_N \sqrt{Q(n)^2}$$

to determine said signal strength measurement.

3. The receiver of claim 1, wherein said elements of said I channel further comprise:
    an amplifier connected to a first output of said down converter; and
    an analog-to-digital converter connected to an output of said amplifier.

4. The receiver of claim 1, wherein said at least one element of said Q channel further comprise:
    an amplifier connected to a first output of said down converter; and
    an analog-to-digital converter connected to an output of said amplifier.

5. The receiver of claim 1, wherein said received signal is a signal which is modulated to provide equal power on both the I and Q channels.

6. The receiver of claim 5, wherein said received signal is a pn sequence.

7. The receiver of claim 5, wherein said received signal is a GMSK modulated signal.

8. A method of performing signal strength measurements in a homodyne receiver, comprising the steps of:
- receiving an incoming signal;
- converting said received signal to complex baseband signals having an I channel and a Q channel; and
- powering down at least one element either of said I channel or said Q channel and processing a remaining channel to produce said signal strength measurements.

9. The method of performing signal strength measurements in a homodyne receiver of claim 8, further comprising the step of:
- calculating $$\text{Mean } RSSI = \frac{\sqrt{2}}{N} \sum_N \sqrt{I(n)^2} \text{ or } \frac{\sqrt{2}}{N} \sum_N \sqrt{Q(n)^2}$$

to determine said signal strength measurement.

10. The method of performing signal strength measurements in a homodyne receiver of claim 8, wherein said step of powering down further comprises the steps of:
- powering down, in said Q channel, an amplifier connected to a first output of said down converter; and
- powering down, in said Q channel, an analog-to-digital converter connected to an output of said amplifier.

11. The method of performing signal strength measurements in a homodyne receiver of claim 8, wherein said step of powering down further comprises the steps of:
- powering down, in said I channel, an amplifier connected to a first output of said down converter; and
- powering down, in said I channel, an analog-to-digital converter connected to an output of said amplifier.

12. The method of performing signal strength measurements in a homodyne receiver of claim 8, wherein said step of receiving further comprises receiving a modulated signal to provide equal power on both the I and Q channels.

13. The method of performing signal strength measurements in a homodyne receiver of claim 12, wherein said step of receiving further comprises receiving a modulated pn sequence.

14. The method of performing signal strength measurements in a homodyne receiver of claim 12, wherein said step of receiving further comprises receiving a GMSK modulated signal.

* * * * *